Oct. 4, 1949.   G. HERBOLSHEIMER   2,483,903
PROCESS OF PREPARING AN ADDITION PRODUCT
OF 1,3 BUTADIENE AND FURFURAL
Filed May 7, 1946
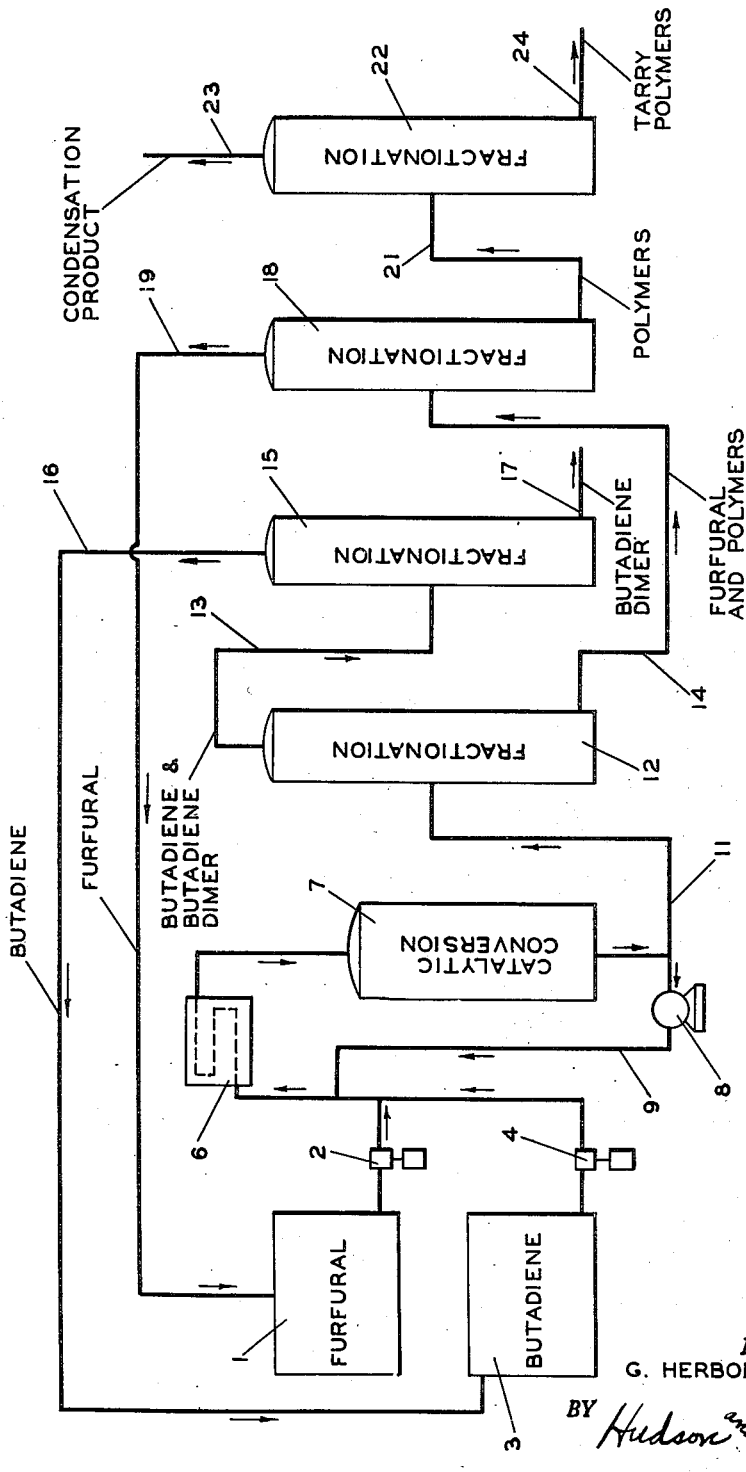
INVENTOR.
G. HERBOLSHEIMER
BY Hudson and Young
ATTORNEYS Patented Oct. 4, 1949

2,483,903

UNITED STATES PATENT OFFICE 2,483,903

PROCESS OF PREPARING AN ADDITION PRODUCT OF 1,3 BUTADIENE AND FURFURAL

Glenn Herbolsheimer, Bartlesville, Okla., assignor to Phillips Petroleum Company, a corporation of Delaware Application May 7, 1946, Serial No. 667,784

12 Claims. (Cl. 260—345)

The present invention relates to a process for the interaction of 1,3-butadiene and furfural. In one of its more specific aspects it relates to a process for the condensation of furfural with butadiene in the presence of a catalyst to form butadiene-furfural addition products.

When furfural is maintained at elevated temperatures for a more or less extened period of time, dark colored tarry polymers of very high molecular weight are formed. These substances are indefinite in composition and they have no known commercial value. It is also known that furfural in the presence of unsaturated hydrocarbons forms dark colored, tarry polymers which may be dried or oxidized to form a solid polymeric material. This polymer is soluble in furfural and in acetone but is of little, if any, commercial value.

It has recently been discovered that 1,3-butadiene may be interacted with furfural under certain controlled conditions to produce an addition product referred to herein as a copolymer of butadiene and furfural. This copolymer and a process for its production is disclosed in the copending application of J. C. Hillyer and D. A. Nicewander, Serial No. 647,178, filed February 12, 1946, now forfeited. The product of the aforesaid process is, in contrast to the dark colored, tarry masses, a pale yellow or amber colored liquid and is composed of a rather complex mixture of condensation or addition products of butadiene and furfural. The process of the present invention is an improvement over that disclosed in the above-mentioned copending application.

The furfural-butadiene copolymer so produced has numerous potential uses: (1) as a component in phenolic resins, plasticizers, tackifiers for synthetic rubber and the like; (2) as an intermediate for synthesis of useful organic chemicals, such as by condensation with either the unsaturated portion of the molecule, or the aldehyde group, or both; (3) and other uses which will be apparent to one skilled in the art.

In accordance with the present invention the reaction of furfural with butadiene is carried out in either liquid or vapor phase in the presence of a catalyst. The use of a catalyst in the manner described herein greatly improves the yield of the desirable liquid polymer of butadiene and furfural with an attendant reduction in the production of undesirable, heavy polymer by-products.

An object of the present invention is to provide a novel process for the production of copolymers of 1,3-butadiene and furfural. Another object of the present invention is to provide a process wherein the principal product of the reaction between furfural and 1,3-butadiene is light-colored, liquid polymer or addition product. Other objects and advantages of the present invention will be apparent to those skilled in the art from the following detailed disclosure.

The accompanying drawing illustrates diagrammatically a preferred embodiment of the present invention.

In accordance with the present invention, a mixture of butadiene and furfural is reacted in the presence of a contact-type catalyst. The solid contact catalysts which are particularly effective for use in the present invention are oxides of various metals, particularly those metals having an atomic number within the range of 24 to 30, inclusive, e. g., iron and copper. Other effective catalysts are ferric chloride, silica gel, alumina, acid-treated clays, synthetic silica-alumina gel, bauxite, fuller's earth, and the like. The condensation reaction may be carried out in the presence of small quantities of oxygen, oxygen-containing gas, or oxygen supplying material. From 0.01 to 1.0 mol per cent of oxygen, based on the total mols of reactants, may be employed.

The process of the present invention may be carried out in a continuous manner by passing the reactants over the solid contact catalysts in either liquid phase or vapor phase. When liquid phase operation is desired the pressure is maintained sufficiently high to prevent vaporization of the reactants at the reaction temperature. In a similar manner when vapor phase reaction is desired the pressure is maintained sufficiently low to prevent the occurrence of condensation in the reaction zone. The partial pressures of the reactants may be reduced by adding a diluent such as nitrogen or other inert gas when continuous vapor phase operation is employed.

It is also possible to carry out this catalytic condensation reaction batch-wise in the liquid phase. In this case it is desirable to agitate the reaction mixture containing the catalyst during at least a portion of the reaction period. In one specific embodiment of the process of the invention, the reaction mixture is maintained at its boiling point at atmospheric pressure and the material which vaporizes is condensed and returned to the reaction zone. If temperatures greater than the atmospheric boiling point of the reacting mixture are contemplated it becomes necessary to increase the pressure sufficiently to prevent vaporization.

Preferably the reaction of the present process is carried out in a continuous manner in the liquid phase at atmospheric or subatmospheric pressure. In order to minimize the reaction of furfural with itself a molar excess of butadiene may be employed advantageously in the reaction mixture. When the reaction is carried out in the vapor phase, the preferred temperature is not appreciably in excess of that required to maintain said vapor phase at the operating pressure.

The reaction may be carried out at temperatures ranging from about 50° F. to about 350° F. The preferred reaction temperature falls within the range of about 200° F. to about 300 F. When the reaction temperature becomes greater than 350° F. undesirable secondary reactions are accelerated and for this reason high temperatures are to be avoided. While a good quality product is obtained at relatively low temperatures, that is, at atmospheric temperature, the period of time required for reaction is considerably extended. The reaction time may also be varied over a wide range, depending on the reaction temperature. A period from about one hour to one hundred hours is suitable for this reaction but a shorter time, that is, from about six to about thirty hours, is usually sufficient and preferably employed. It will be obvious to one skilled in the art that the reaction temperature and contact time are dependent variables; that is, a given conversion may be maintained within limits by increasing the reaction temperature and decreasing the contact time, or vice versa.

Pressures are in general not critical and may be varied over a rather wide range as desired. Effective conversion is usually obtained at atmospheric pressure or at a pressure substantially equal to the vapor pressure of the reacting mixture at the operating temperature. Pressures may be controlled by the use of more or less volatile or gaseous diluent when the reaction is carried out in the vapor phase and by conventional pressure control when the reaction is carried out in the liquid phase.

It is sometimes desirable to employ an inert diluent in the reaction zone to prevent excessive polymerization of either compound with itself. An inert gas such as nitrogen may be used for continuous, vapor phase reaction while a paraffinic hydrocarbon or similar material may be employed for the liquid phase reaction.

While the above mentioned ranges of temperature, concentration of reactants, pressure, contact time, etc. represent conditions under which it is generally preferable to operate the process of the present invention, they are by no means to be construed as limiting in nature. Obviously, a certain interdependence exists among these variables; for example, when it is desired to reduce the contact time, the temperature, or butadiene concentration, or both may be increased. In general, alterations of any variable will usually require a corresponding adjustment in one or more of the interdependent variables if efficient operation is to be maintained.

Preferably the reactants used in carrying out the process of the present invention are anhydrous. However, furfural having a water content within the range of from about 1 to about 10 weight per cent may be successfully employed in the present process. Furfural having above about 10 per cent water tends to form excessive quantities of undesirable tarry substances which contaminate the product and reduce the yield. This tar-like material is apparently the result of a secondary condensation of the product with furfural.

In carrying out the reaction a mixture of butadiene and furfural is heated to the desired reaction temperature, preferably within the range of 200 to 300° F., and is passed into contact with the catalyst. The catalyst is suitably contained in a pressure vessel of the type commonly used in carrying out other reactions with contact catalysts. The catalyst may be in the form of small particles held in place within the vessel by foraminous plates or other suitable means which permit flow of the reactants therethrough. Because of the relatively low rate of reaction between butadiene and furfural it is preferable to carry out the reaction in liquid phase and to pass the reaction mixture slowly over the catalyst.

In some instances it may be desirable to carry out the process by passing a mixture of the liquid reactants through a bed of the solid contact catalyst, withdrawing the effluent and recirculating a portion thereof to the catalyst zone. The remaining portion of the effluent stream may be withdrawn continuously and processed for recovery of the desired product. The unchanged reactants may be separated by steam stripping at relatively low temperatures and the product purified by distillation, preferably at reduced pressure. The fresh feed consisting of butadiene and furfural must be fed to the system at the same rate as that at which the product and by-products are withdrawn from the effluent to maintain steady flow rates and operating conditions.

The butadiene dimer, which may be formed in an appreciable amount during the course of the condensation reaction, may be removed in the stripping operation or in a separate operation, such as by distillation at atmospheric or subatmospheric pressure. The separation of the polymeric condensation product from the higher boiling tarry by-products may be effected by distillation at subatmospheric pressure, or at substantially atmospheric pressure in the presence of a suitable stripping agent, such as steam.

As a specific example of the operation of my invention, the preferred method is shown in the drawing, and will be described below. With reference to the figure, equal parts by weight of furfural and butadiene are withdrawn from furfural storage 1 by pump 2 and from butadiene storage 3 by pump 4. The admixed raw materials pass through heater 6 and into the catalytic conversion chamber 7. In the catalyst chamber the reactants pass over silica-alumina gel, preferably in the form of small pellets. A portion of the effluent may be recycled by pump 8 via line 9 to the feed stream entering the above-mentioned heater 6. This is commonly known as "recycle operation" and results in a shorter contact time per pass through the reaction zone 7 than is required when only single pass operation is employed. An average contact time in the reaction zone of approximately 6 hours is preferred.

A portion of the catalyst chamber effluent is passed via line 11 to a fractionating zone 12. In this zone a separation into the following two fractions is effected; (1) the lower boiling fraction which contains butadiene, butadiene dimer, and any other compounds boiling at temperatures lower than the boiling point of furfural, which are removed as the overhead product via line 13; and (2) the fraction containing the unreacted furfural, desired reaction products, and high molecular weight tarry polymers, which is removed as the bottoms product via line 14. The lower boiling fraction passes via line 13 into fractionation zone 15 where unreacted butadiene is removed via line 16 and returned to butadiene storage 3. The butadiene dimer and any material boiling above butadiene which enters zone 15 is removed via line 17. If desired the impure butadiene dimer stream may be taken to a separate zone, not illustrated, purified, and the butadiene dimer dedimerized. The resulting butadiene may then be recovered and returned to storage 3.

The condensation product, together with unreacted furfural and tarry by-products, is passed by line 14 into fractionating zone 18. The unreacted furfural is separated and passed via line 19 to furfural storage 1. The desired condensation product together with heavier materials is removed via line 21. The fractionation in zone 18 is preferably carried out at reduced pressure in order that a relatively low temperature will be maintained. This is essential inasmuch as temperatures which would result from operation at atmospheric pressure would cause excessive polymerization of the furfural and decomposition of the desired reaction products. The necessary low temperature may be attained either by operating under a vacuum with the pressure in the range of 100 to 200 mm. of mercury absolute, or by the use of a stripping agent, such as steam.

The final purification of the desired reaction product is made in fractionation zone 22 with a condensation product being removed overhead through line 23 and the tarry polymers being removed through line 24. This fractionation is usually carried out under a vacuum, preferably at a pressure of 50 mm. of mercury absolute, or less. The polymeric condensation product boils at a temperature of about 200 to about 320° F. under an absolute pressure of about 1 mm. of mercury. The major portion boils within a temperature range of 225 to about 275° F. at an absolute pressure of 1 mm. of mercury.

The copolymer thus obtained is apparently a rather complex mixture of condensation products of butadiene and furfural, and its composition cannot be determined readily. The refractive index of the various fractions ranges from about 1.520 to about 1.530 at 25° C. and the specific gravity ranges from about 1.08 to about 1.16 at 20° C. The average molecular weight was determined as about 210. The physical properties of various fractions of the polymer having boiling points within the range of 200 to 320° F. at an absolute pressure of about 1 mm. of mercury are somewhat variable.

The exact nature of the reaction involved in the process is not fully understood. Based on the previously mentioned physical and chemical properties of the product the reactions involved appear to comprise condensations between butadiene and the nucleus of the furfural. The true nature of the composition of the product is not known. From the boiling range observed with a substantially continuous rise in the boiling points as distillation progresses, it may be assumed that the liquid polymer is made up of a number of homologous compounds of increasing molecular weight in varying proportions. These compounds may comprise multiple or fused ring types in which both six-membered rings made up wholly of carbon atoms and five-membered oxygen-containing (furan) rings occur.

While I have disclosed herein various aspects of the present process, particularly preferred specific embodiments thereof, it is to be understood that the foregoing descriptive material is by way of illustration only and does not in any way limit the scope of the present invention.

I claim:

1. The process which comprises reacting 1,3-butadiene with furfural so as to form a liquid addition product at a temperature within the range of 50 to 350° F. in the presence of a solid contact-type condensation catalyst.

2. A process for the preparation of an addition product of 1,3-butadiene and furfural which comprises reacting a mixture comprising from 3 to 50 parts by weight, 1,3-butadiene with 50 to 97 parts by weight furfural at a temperature within the range of from 50° F. to 350° F. in the presence of a solid contact-type condensation catalyst.

3. A process for the preparation of a liquid addition product of 1,3-butadiene and furfural which comprises reacting a mixture comprising from 3 to 50 parts by weight 1,3-butadiene and from 50 to 97 parts by weight furfural at a temperature within the range of from 200° F. to 300° F. in the presence of a solid contact-type catalyst comprising essentially silica and alumina.

4. The process for the preparation of a liquid addition product from furfural and butadiene which comprises reacting a mixture comprising from 3 to 50 parts by weight 1,3-butadiene and from 50 to 97 parts by weight furfural at a temperature within the range of from 200° F. to 300° F. in the presence of an oxide of a metal having an atomic number within the range of 24 to 30 inclusive.

5. A process for the preparation of a liquid addition product from butadiene and furfural which comprises reacting a mixture comprising from 3 to 50 parts by weight 1,3-butadiene and from 50 to 97 parts by weight furfural at a temperature within the range of from 200° F. to 300° F. in the presence of a catalyst comprising essentially silica gel.

6. A process for the preparation of a liquid addition product from butadiene and furfural which comprises reacting a mixture comprising from 3 to 50 parts by weight, 1,3-butadiene and from 50 to 97 parts by weight furfural at a temperature within the range of from 200° F. to 300° F. in the presence of copper oxide as a catalyst.

7. The process which comprises reacting 1,3-butadiene with furfural so as to form a liquid addition product at a temperature within the range of 50 to 350° F. in the presence of a solid contact-type condensation catalyst and a minor proportion of oxygen.

8. A process for the preparation of an addition product of 1,3-butadiene and furfural which comprises reacting a mixture comprising from 3 to 50 parts by weight 1,3-butadiene with 50 to 97 parts by weight furfural at a temperature within the range of from 50° F. to 350° F. in the presence of a solid contact-type condensation catalyst and in the presence of from 0.01 to 1.0 mol per cent oxygen.

9. The process for the preparation of a liquid addition product from furfural and butadiene which comprises reacting a mixture comprising from 3 to 50 parts by weight 1,3-butadiene and from 50 to 97 parts by weight furfural at a temperature within the range of from 200° F. to 300° F. in the presence of an oxide of a metal having an atomic number within the range of 24 to 30 inclusive and in the presence of from 0.01 to 1.0 mol per cent oxygen.

10. A process for the preparation of a liquid addition product from butadiene and furfural which comprises reacting a mixture comprising from 3 to 50 parts by weight 1,3-butadiene and from 50 to 97 parts by weight furfural at a temperature within the range of from 200° F. to 300° F. in the presence of a catalyst comprising essentially silica gel and in the presence of from 0.01 to 1.0 mol per cent oxygen.

11. The process of claim 3 wherein the reactants are admixed with a minor proportion of oxygen.

12. The process of claim 3 wherein the reactants are admixed with oxygen in an amount in the range of 0.01 to 1.0 mol per cent of the reactants.

GLENN HERBOLSHEIMER.

REFERENCES CITED

The following references are of record in the file of this patent:

UNITED STATES PATENTS

| Number | Name | Date |
|---|---|---|
| 1,933,715 | Day | Nov. 7, 1933 |
| 2,008,491 | Ebert et al. | July 16, 1935 |